(12) United States Patent
Arnold et al.

(10) Patent No.: US 9,647,842 B2
(45) Date of Patent: *May 9, 2017

(54) DUAL-PARTY SESSION KEY DERIVATION

(71) Applicant: International Business Machines Corporation, Armonk, NY (US)

(72) Inventors: Todd W. Arnold, Charlotte, NC (US); Richard V. Kisley, Charlotte, NC (US); Michael J. Miele, Concord, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/260,915

(22) Filed: Sep. 9, 2016

(65) Prior Publication Data

US 2016/0373259 A1    Dec. 22, 2016

Related U.S. Application Data

(63) Continuation of application No. 15/062,550, filed on Mar. 7, 2016, now Pat. No. 9,473,299, which is a continuation of application No. 14/267,147, filed on May 1, 2014, now Pat. No. 9,485,091.

(51) Int. Cl.
*H04L 29/06* (2006.01)
*H04L 9/32* (2006.01)

(52) U.S. Cl.
CPC ............ *H04L 9/3234* (2013.01); *H04L 63/06* (2013.01)

(58) Field of Classification Search
None
See application file for complete search history.

(56) References Cited

U.S. PATENT DOCUMENTS

| | | | |
|---|---|---|---|
| 7,831,051 B2 * | 11/2010 | Zunke | H04L 9/0822 380/277 |
| 9,270,449 B1 * | 2/2016 | Tribble | H04L 63/0435 |
| 2012/0144193 A1 * | 6/2012 | Le Saint | H04L 9/3234 713/168 |
| 2015/0100793 A1 * | 4/2015 | Newell | G06F 21/76 713/189 |
| 2016/0014116 A1 | 1/2016 | Babbidge et al. | |

* cited by examiner

*Primary Examiner* — Fatoumata Traore
(74) *Attorney, Agent, or Firm* — Cantor Colburn LLP; Steven Chiu

(57) ABSTRACT

A session key is negotiated to secure a user session executed in a host computer. An electronic hardware security module (HSM) located in the host computer generates a first session key. A smart card generates a second session key that matches the first session key. An encrypted copy of the second session key is communicated to an electronic host application module installed in the host computer. The electronic host application module decrypts the encrypted session key to obtain a copy of the session key such that the first and second session keys possessed by the smart card, the host application module and the HSM match one another.

1 Claim, 5 Drawing Sheets

DUAL-PARTY SESSION KEY DERIVATION

DOMESTIC PRIORITY

This application is a continuation of U.S. patent application Ser. No. 15/062,550, filed Mar. 7, 2016, which is a continuation application of U.S. patent application Ser. No. 14/267,147, filed May 1, 2014, the disclosure of which is incorporated by reference herein in its entirety.

BACKGROUND

The present invention relates generally to common cryptographic architecture and more specifically, to a dual-party session key derivation system.

A hardware security module (HSM) is a device with a secure boundary meeting U.S. Government and financial industry security standards for intrusion detection and maintenance of secure data. Common cryptographic architecture (CCA) is a programming interface to the HSM and is noted for achieving secure processing of financial transactions using secret keys and for management of the secret keys.

The HSM is sometimes used as a coprocessor element installed on a host computer. In this installment, the HSM is administered locally for provisioning of secret keys to the HSM itself or as part of an administration session between this host computer and other host computers that have their own HSMs installed. A user of the HSM is authorized using a sophisticated logon process. The user possesses a personal smart card which is read by a smart card reader device, and the credentials stored on the smart card are communicated to the HSM.

SUMMARY

According to an embodiment, a method of negotiating a session key to secure a user session executed in a host computer includes generating, by an electronic hardware security module (HSM) located in the host computer, a first session key. The method further includes generating, by an electronic smart card, a second session key that matches the first session key. The method further includes encrypting a copy of the second session key based on encryption information provided by the HSM to generate an encrypted session key and communicating the encrypted session key to an electronic host application module installed in the host computer. The method further includes decrypting, by the electronic host application module, the encrypted session key to obtain the copy of the second session key such that the first and second session keys possessed by the smart card, the host application module and the HSM match one another.

According to another embodiment, a computer program product for implementing a method of negotiating a session key to secure a user session executed in a host computer comprises a computer readable storage medium. The computer readable storage medium includes program instructions embodied therewith, which cause the processing circuit to perform a method. The method comprises generating, by an electronic hardware security module (HSM) located in the host computer, a first session key, and generating, by an electronic smart card, a second session key that matches the first session key. The method further includes encrypting a copy of the second session key to generate an encrypted session key and communicating the encrypted session key to an electronic host application module installed in the host computer. The method further includes decrypting, by the electronic host application module, the encrypted session key to obtain the copy of the second session key such that the first and second session keys possessed by the smart card, the host application module and the HSM match one another.

According to yet another embodiment, a computer system for implementing a method of negotiating a session key to secure a user session executed in a host computer comprises a memory and a computer processor. The memory has computer readable instructions. The computer processor is configured to execute the computer readable instructions. The computer readable instructions comprise the operations of generating, by an electronic hardware security module (HSM) located in the host computer, a first session key, and generating, by an electronic smart card, a second session key that matches the first session key. The computer readable instructions further comprises encrypting a copy of the second session key to generate an encrypted session key and communicating the encrypted session key to an electronic host application module installed in the host computer. The computer readable instructions further comprises decrypting, by the electronic host application module, the encrypted session key to obtain the copy of the second session key such that the first and second session keys possessed by the smart card, the host application module and the HSM match one another.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

At least one exemplary embodiment provides a security system that derives a session key used to secure a user session in a host computer. The security system negotiates the session key between two secure parties using two ephemeral elliptic curve cryptography (ECC) keys and one transitory symmetric key.

Figure 1:
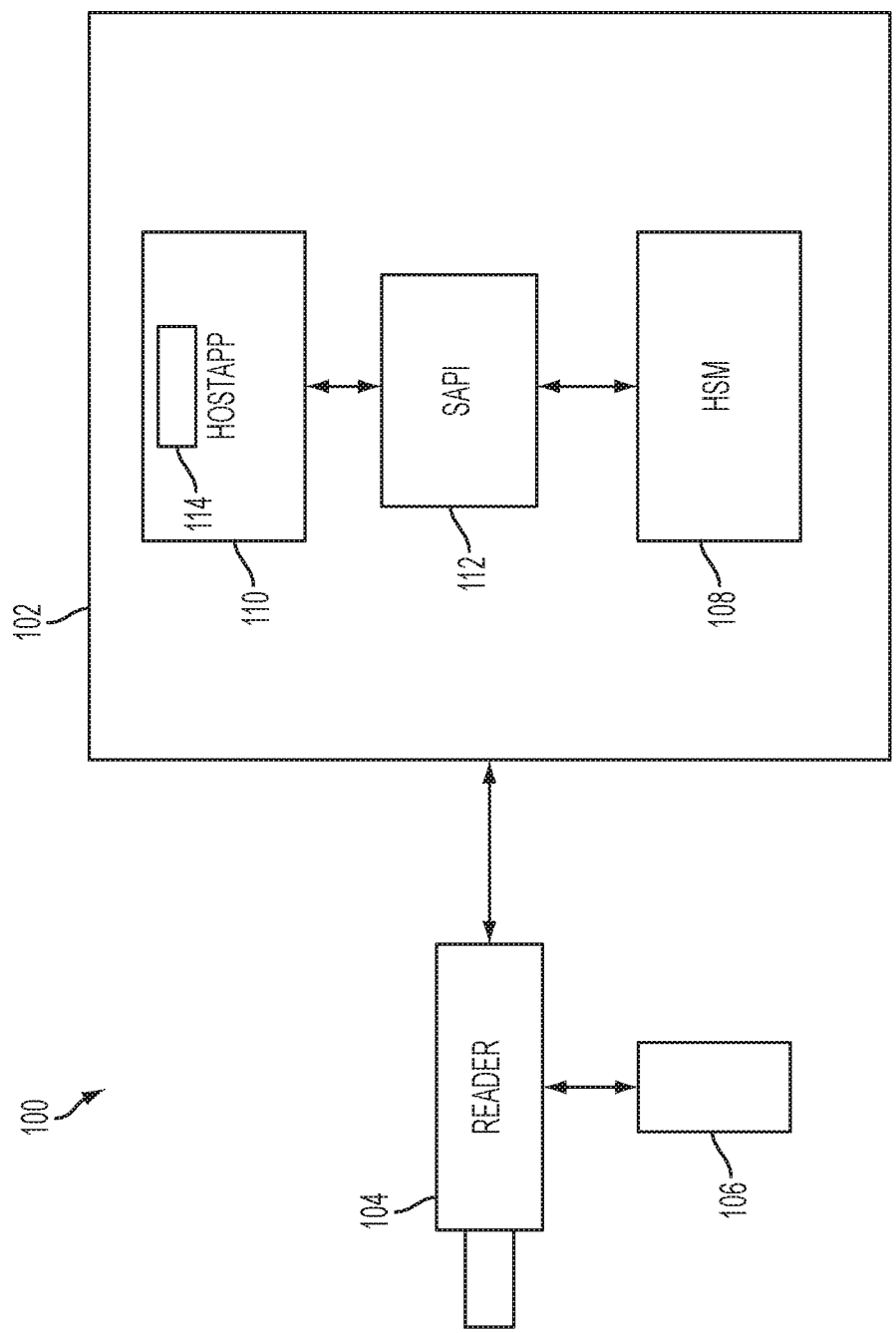
FIG. 1 illustrates a security system in accordance with an embodiment.

Referring to FIG. 1, a security system 100 in accordance with an embodiment is generally shown. The security system 100 comprises a host computer 102 controlled by a user, and a card reader 104 configured to electrically communicate with a smart card 106 possessed by the user.

The host computer 102 includes a hardware security module (HSM) 108, a host application module (HOSTAPP) 110, and a security application program interface (SAPI) module 112. The host computer 102 is a 'gateway' or access point for interacting with the HSM 108. The HSM 108 may itself be a peripheral-component-interconnect (PCI) adapter, for example, operating at the host computer 102. The HSM 108 is configured as a special purpose computer running on a local network which is accessible by the user via the host computer 102. According to an embodiment, the HSM 108 is configured to require the user to be properly authenticated before taking action. The host application module 110 executes an application 114 for authenticating the user based on the on the credentials stored on the smart card 106 and stores one or more user identification numbers (UIDs) corresponding to a user profile as discussed in greater detail below. The SAPI 112 includes one or more shared SAPI libraries utilized by the host computer 102 to communicate with the HSM 108. According to an embodiment, the SAPI 112 is controlled by the host application module 110, which initiates operations by calling an entry point in the SAPI 112.

Figure 2:
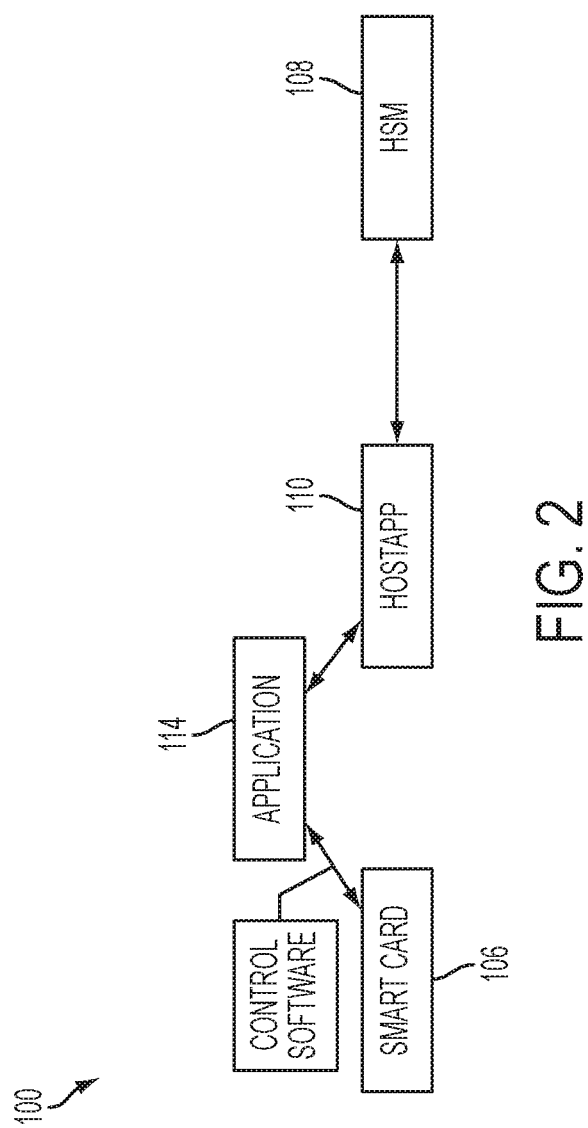
FIG. 2 is a diagram illustrating a communication flow among the elements included in the security system in accordance with an embodiment.

The card reader 104 is in electrical communication with the host computer 102 and is configured to read data stored on the smart card 106. The smart card 106 may be configured as an electronic module that stores control software and the credentials of the user in the form of special secret keys and that internally performs cryptographic actions with the secret keys to prove the identity of the cardholder. The control software may include a smart card application programming interface (SCAPI), and software such as applets, for example, that generate secret keys and signatures. According to an embodiment, the reader 104 is configured to energize the smart card 106 and communicate data stored on the smart card 106 to the host application module 110. The host application module 110 communicates the authentication to the HSM 108 such that the user is authorized to access and control the HSM 108. A diagram illustrating a communication flow among the elements of the security system 100 described above is illustrated in FIG. 2.

Figure 3:
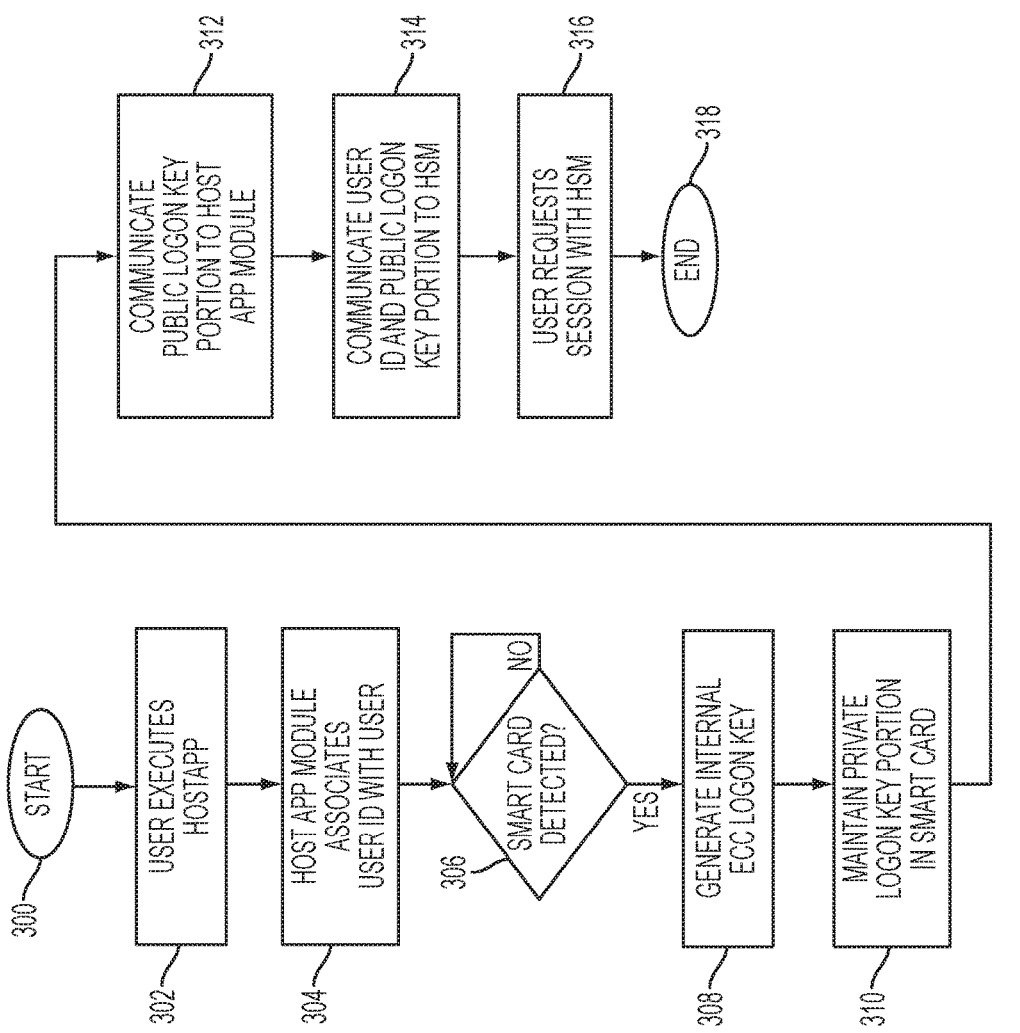
FIG. 3 is a flow diagram illustrating a method of setting up a user profile prior to deriving a session key used to secure a user session in a host computer according to an embodiment.

According to an embodiment, a user setup and storage operation is performed prior to deriving the session key used to secure the user session in the host computer 102. A flow diagram illustrating a user setup and storage operation according to an exemplary embodiment is shown in FIG. 3. The method begins at operation 300 and at operation 302 a user initiates a host application (HOSTAPP) executed by the host application module 110. At operation 304, the host application module 110 associates a user identification number (UID) with the user. The UID may be an alphanumeric identification number, for example. At operation 306, a determination is made as to whether the smart card 106 is in electrical communication with the card reader 104. According to one embodiment, the smart card 106 is determined to be in electrical communication with the card reader 104 by locating the smart card 106 in close proximity of the card reader 104 such that the smart card 106 is energized. According to another embodiment, the smart card 106 may be electrically connected to the card reader 104 such that the card reader 104 detects the smart card 106. If the smart card 106 is not in electrical communication with the card reader 104 (i.e., not detected), the method returns to operation 306.

If the smart card 106 is in electrical communication with the card reader 104, the smart card 106 generates an ECC key (LOGONKEY) at operation 308. According to an embodiment, the LOGONKEY is a non-ephemeral (i.e., static) ECC key. The LOGONKEY includes a private portion (LOGONKEY-PV) and a public portion (LOGONKEY-PB). At operation 310, the LOGONKEY-PV is maintained in the smart card 106. At operation 312, the card reader 104 communicates the LOGONKEY-PB to the host application module 110. At operation 314, the host application module 110 communicates the UID and the LOGONKEY-PB to the HSM 108. At operation 316, the user requests a session with the HSM 108 and the user setup and storage operation ends at operation 318. Therefore, the user setup and storage operation allows the HSM 108 to determine which user is to be authenticated using a session key derivation operation described in greater detail below. According to an embodiment, the HSM 108 may store a plurality of user profiles following completion of each respective user setup and storage operation and may be utilized when performing future logon operations.

Figure 4:
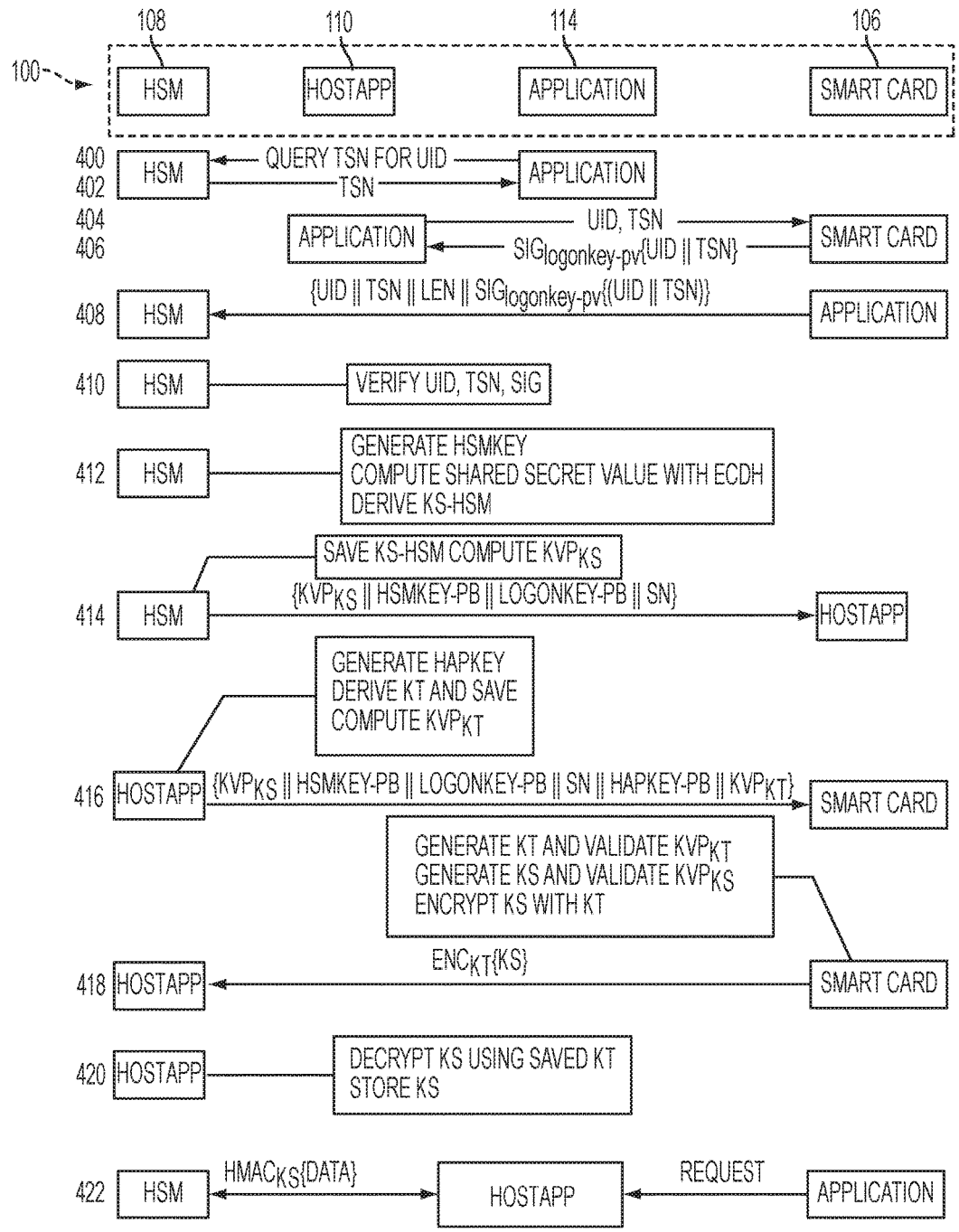
FIG. 4 is an operation sequence diagram illustrating operations for deriving a session key used to secure a user session in a host computer according to an embodiment in accordance with an embodiment.

Turning now to FIG. 4, an operation sequence diagram illustrating operations for deriving a session key used to secure a user session in a host computer according to an embodiment in accordance with an embodiment.

At operation 400, the host application module 110 queries the HSM 108 and obtains a transaction sequence number (TSN) corresponding to the user who initiated the logon operation. As described above, the user is mapped to a unique UID. Based on the query, the UID is sent by the host application module 110 to the HSM 108. The HSM 108 returns the TSN for the corresponding UID to the host application module 110 at operation 402. According to an embodiment, a new TSN corresponding to the UID may be generated.

At operation 404. The host application module 110 sends the TSN and UID to the smart card 106. At operation 406. The smart card 106 generates an elliptical curve signature ($SIG_{LOGONKEY-PV}$) over the TSN and UID using the LOGONKEY-PV. The $SIG_{LOGONKEY-PV}$ is then communicated to the host application module 110. The $SIG_{LOGONKEY-PV}$ may be generated according to an Elliptic Curve Digital Signature Algorithm (ECDSA) as understood by one of ordinary skill in the art. To maintain security strength, at least one embodiment uses a hash method to create the digest that is signed. The hash method is based on secure hash algorithm (SHA)-256 if the LOGONKEY-PV curve length is less than 384, SHA-384 if the LOGONKEY-PV curve length is greater than or equal to 384 and less than 512, and SHA-512 if the LOGONKEY-PV curve length is greater than or equal to 512.

At operation 408, the host application module 110 requests a logon operation of the HSM 108 indicating that an ECC public key will be used. The authentication data includes a UID, a TSN, and a length of the $SIG_{LOGONKEY-PV}$. The length of $SIG_{LOGONKEY-PV}$ is encoded as 2 bytes according to, for example, big endian format. Another element of the authentication data is that the $SIG_{LOGONKEY-PV}$ itself as binary data, for example.

At operation 410. The HSM 108 receives the authentication data, and verifies that the TSN is associated with the UID and the $SIG_{LOGONKEY-PV}$. According to an embodiment, the TSN verification includes verifying that the TSN associated with the UID communicated at operation 400 matches the TSN communicated in the instant operation. The HSM 108 will also internally increment the TSN. According to an embodiment, the HSM 108 verifies $SIG_{LOGONKEY-PV}$ using the LOGONKEY-PB that was communicated to the HSM 108 in the user profile setup and storage operation described above. In this regard, the HSM 108 associates the LOGONKEY-PB with the UID communicated during the setup and storage operation (e.g., operation 314), the operation 400 and the instant operation 410.

At operation 412, the HSM 108 generates a first ephemeral ECC key (HSMKEY). The first ephemeral ECC key includes a public portion (HSMKEY-PB) and a private portion (HSMKEY-PV). The public portion (HSMKEY-PB) and a private portion (HSMKEY-PV) have the same type and size as that of the LOGONKEY-PB associated with the UID. Using the public portion (HSMKEY-PB), the private portion (HSMKEY-PV) and the LOGONKEY-PB, the HSM 108 generates a shared secret value. According to an embodiment, the shared secret value is generated according to an Elliptical Curve Diffie-Hellman (ECDH) protocol as understood by one of ordinary skill in the art. The secret value may then be used to derive a session key (KS-HSM) in the HSM. According to an embodiment, the KS-HSM is derived using the secret value, the TSN/UID data bytes, and a serial number of the HSM 108. The KS-HSM may then be stored in the HSM 108 and may be used to communicate with the host application module 110 when the negotiation operation is complete. According to an embodiment, the KS-HSM may be derived according to, for example, Concatenation Key Derivation Function (CKDF).

At operation 414, the HSM 108 completes the internal user logon operation. According to an embodiment, the HSM 108 determines the UID as logged on in an internal data structure, saves the KS-HSM in the internal data structure associated with the UID, and returns the UID and a key verification patterns (KVP) corresponding to KS i.e., ($KVP_{KS-HSM}$) to the host application module 110. According to an embodiment, the $KVP_{KS-HSM}$ is based on a corresponding 8 byte key verification pattern (KVP). The KVP is generated, for example, using the leftmost 8 bytes of the SHA-256 hash of a concatenation of a 1 byte piece of data with value 0x01 and the KS-HSM.

At operation 416, the host application module 110 generates a second ephemeral ECC key (HAPKEY) and a respective transport key (KT-HAP). The HAPKEY includes a public portion (HAPKEY-PB) and a private portion (HAPKEY-PV). The KT-HAP is based on the HAPKEY. According to an embodiment, the derivation of the KT-HAP is based on the generated HAPKEY, the LOGONKEY-PB, the serial number of the HSM 108, the UID, and the TSN. The KT-HAP is stored in a data structure in the host application module 110. A CKDF process, for example, may be used to derive the KT-HAP. The host application module 110 further generates a corresponding 8 byte KVP over the KT-HAP ($KVP_{KT-HAP}$). The $KVP_{KT-HAP}$ is based on, for example, the leftmost 8 bytes of the SHA-256 hash of 0x01 concatenated with the corresponding KT-HAP. The HAPKEY-PB, and the KVP of the KT-HAP is returned to the smart card 106.

At operation 418, the smart card 106 communicates with the host application module 110 to generate an encrypted session key (ENCKT_KS). The ENCKT_KS includes the session key (KS) corresponding to the smart card 106 encrypted with the corresponding transport key (KT). In at least one embodiment, the smart card 106 will compute a pair of KVP. That is, a first KVP is generated corresponding to the KS-SMS and a second KVP is generated corresponding to the KT-SMC. The smart card 106 is then configured to compare the result with the received values. If the KVP pairs match, then the resulting session keys will also match.

The resulting session key corresponding to the smart card (KS-SMC) will be encrypted with transport key corresponding to the smart card 106 (KT-SMC) and then sent to the host application module 110. According to an embodiment, the smart card 106 generates a respective transport key (KT-SMC) using the same process and input data as used to create KT-HAP. In this regard, both the LOGONKEY-PB and LOGONKEY-PV are used with HAPKEY-PB according to the ECDH protocol as understood by one of ordinary skill in the art. According to an embodiment, the KS-SMC is derived independently by both the HSM 108 and the smart card 106. The KS-SMC is generated, for example, using the same process and input data as used to create KS-HSM. In this case, however, both the LOGONKEY_PB and LOGONKEY_PV are used with HSMKEY-PB to generate the KS-SMC according to the ECDH protocol as understood by one of ordinary skill in the art. Accordingly, the resulting KS-SMC is encrypted with KT-SMC to generate the encrypted session key ($ENC_{KT\_}KS$). The encrypted session key ($ENC_{KT\_}KS$) is then sent to the host application module 110.

At operation 420, the host application module 110 decrypts ($ENC_{KT\_}KS$) using the KT-HAP to obtain a copy of the session key (KS-SMC) derived by the smart card 106. The KS-SMC is then stored in an internal data structure with the other data of the respective UID.

At operation 422, all subsequent communication between the host application module 110 and the HSM 108 corresponding to the UID is authenticated until the user is logged off. The authentication of the communication between the host application module 110 and HSM 108 may be based on, for example, a hash-based message authentication code (HMAC)-SHA-256 using the decrypted session key which matches the KS-SMC and the KS-HSM.

Figure 5:
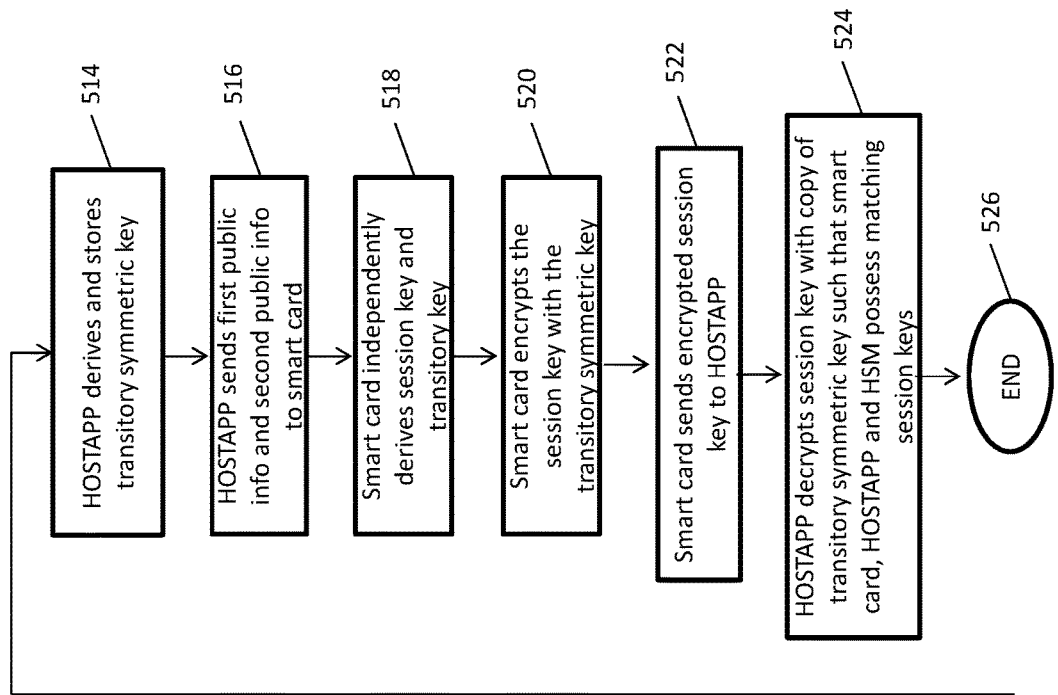
FIG. 5 is a flow diagram illustrating a method of deriving a session key used to secure a user session in a host computer according to an embodiment.
Figure 5:
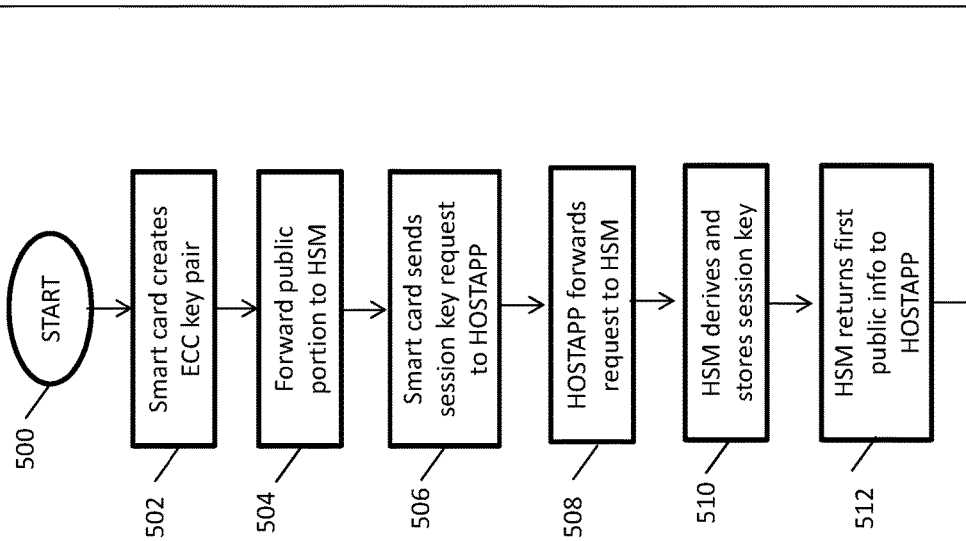

Turning now to FIG. 5, a flow diagram illustrates a method of deriving a session key used to secure a user session in a host computer according to an embodiment. The method begins at operation 500, and at operation 502 a first party, for example a smart card, creates an ECC key pair. At operation 504, the first party sends the public portion of the ECC key pair to a third party, for example, a hardware security module (HSM), for persistent storage. At operation 506, the first party sends a session key request to a second party such as, for example, a host application (i.e., HOSTAPP). At operation 508, the second party forwards the session key request to the third party. At operation 510, the third party derives and stores a session key in response to the request. At operation 512, the third party returns first public information to the second party. At operation 514, the second party derives and stores a transitory symmetric key. At operation 516, the second party sends the first public information and additional second public information to the first party. At operation 518, the first party independently derives the session key and the transitory symmetric key. At operation 520, the first party encrypts the session key with transitory symmetric key. At operation 522, the first party sends the encrypted session key to the second party. At operation 524, the second party decrypts the session key with a copy of the transitory symmetric key such that all parties (e.g., each of the first party, the second party and the third party) possess matching session keys. The method ends at operation 526.

Technical effects and benefits include a negotiation operation that runs partially in the HSM 108 and partially in the host application module 110 in order to authenticate the credentials of the user from the smart card 106 and then to establish a secure session with one endpoint in the host application module 110 and the other endpoint in the HSM 108. In this regard, the negotiation operations are performed in a respective secured device while data communicated between the secured devices is encrypted. The secure session is embodied in the use of a shared secret session key for establishing a secure communication between the host application module 110 and the HSM 108. Accordingly, the smart card 106 and the HSM 108 each derive a respective secret session key, while the host application module 110 receives an encrypted copy of the secret session key. The host application module 110 decrypts the received encrypted copy of the session key such that each of the smart card 106, the HSM 108 and the host application module ultimately share a copy of the secret session key. In this regard, the secret session key is not communicated on unsecure communication paths in a non-encrypted state.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Features of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, the term "module" refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of negotiating a session key between two secure parties, the method comprising:

running a first negotiation operation in a hardware security module (HSM) to request a secret session key logon operation, and running a second negotiation operation in a host application module so as to authenticate the credentials of a user from a smart card to secure the secret session key logon operation; and establishing a secure session with a first endpoint in the host application module and a second endpoint in the HSM such that the first and second negotiation operations are performed in a respective secured device while data communicated between the secured devices is encrypted, wherein the secure session is secured after completing the first and the second negotiation operations to derive the secret session key, the secret session key establishing a secure communication between the host application module and the HSM such that the smart card and the HSM each derive a respective secret session key, while the host application module receives an encrypted copy of the secret session key, and wherein the host application module decrypts the received encrypted copy of the session key such that each of the smart card, the HSM and the host application module ultimately share a copy of the secret session key, and the secret session key is not communicated on unsecure communication paths in a non-encrypted state.

* * * * *